US012341268B2

(12) United States Patent
Wettergren

(10) Patent No.: US 12,341,268 B2
(45) Date of Patent: Jun. 24, 2025

(54) ANTENNA ARRANGEMENTS FOR HEAVY-DUTY VEHICLES

(71) Applicant: VOLVO TRUCK CORPORATION, Gothenburg (SE)

(72) Inventor: Johan Wettergren, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 166 days.

(21) Appl. No.: 18/180,371

(22) Filed: Mar. 8, 2023

(65) Prior Publication Data

US 2023/0307840 A1 Sep. 28, 2023

(30) Foreign Application Priority Data

Mar. 24, 2022 (EP) .................................... 22164007

(51) Int. Cl.
*H01Q 9/04* (2006.01)
*H01Q 1/32* (2006.01)

(52) U.S. Cl.
CPC ............ *H01Q 9/0435* (2013.01); *H01Q 1/32* (2013.01)

(58) Field of Classification Search
CPC ........ H01Q 9/0435; H01Q 1/32; H01Q 1/325; H01Q 1/3266; H01Q 1/3275; H01Q 21/24; H01Q 1/3216
See application file for complete search history.

(56) References Cited

U.S. PATENT DOCUMENTS 7,002,524 B1 * 2/2006 Branham .............. B60R 1/0605 343/715
10,520,951 B2 * 12/2019 MacNeille ........... G05D 1/0287
2016/0064805 A1 * 3/2016 Petrucci ................ H04W 88/08 343/713
2019/0058248 A1 * 2/2019 Kopelman ........... H01Q 1/3208
2020/0182963 A1 6/2020 Izadian
2020/0296600 A1 9/2020 Karlsson et al.
2021/0063557 A1 3/2021 Yu et al.
2021/0185635 A1 6/2021 Dieckmann et al.
2021/0242578 A1 8/2021 Inomata et al.

FOREIGN PATENT DOCUMENTS

EP 0884796 A2 12/1998
SE 2000168 A1 3/2022
WO 2021019200 A1 2/2021

OTHER PUBLICATIONS

Extended European Search Report in corresponding European Application No. 22164007.1 dated Oct. 7, 2022 (9 pages).

* cited by examiner

*Primary Examiner* — Seung H Lee
(74) *Attorney, Agent, or Firm* — Venable LLP; Jeffri A. Kaminski

(57) ABSTRACT

A heavy-duty vehicle unit comprising a body structure arranged to be supported on a horizontal ground surface by a plurality of wheels, the body structure comprising a front surface, a top surface and left and right side surfaces. The front surface is arranged transversally to the ground surface and facing in a longitudinal direction of the vehicle unit, where the left and right side surfaces are arranged transversally to the ground surface and facing in respective lateral directions of the vehicle unit. The top surface is arranged distally from the ground surface and transversal to the front surface and to the side surfaces. The heavy-duty vehicle unit comprises one or more horizontally polarized antenna elements arranged extending out from the left and/or right side surface of the body structure.

14 Claims, 2 Drawing Sheets

ANTENNA ARRANGEMENTS FOR HEAVY-DUTY VEHICLES

TECHNICAL FIELD

The present disclosure relates to antenna arrangements and radio systems for communication involving one or more heavy-duty vehicles such as semi-trailer vehicles and trucks. The techniques disclosed herein can also be applied in other types of vehicles, e.g., in construction equipment and in passenger cars.

BACKGROUND

Radio communication between two or more vehicles (vehicle-to-vehicle, V2V), and between vehicles and fixed infrastructure (vehicle-to-infrastructure, V2I), jointly referred to as V2X systems, is becoming increasingly common. For instance, the IEEE 802.11p wireless communication system is an approved amendment to the IEEE 802.11 family of standards which adds wireless access in vehicular environments to the suite.

Numerous applications involving the exchange of information via wireless transmission to and from a vehicle have been proposed. The applications range from non-critical entertainment functions such as downloading of music and videos, to over-the-air (OTA) software upgrades and functional safety applications with strict requirements on both reliability and latency.

An emergency electronic brake light, for example, is an automotive safety function where a vehicle informs nearby vehicles about the onset of a hard braking maneuver. The communicated data is received, e.g., by vehicles to the rear of the braking vehicle, where it can be used to alert drivers of the event, or even for triggering automatic braking systems, thereby reducing the risk of collision.

A heavy-duty vehicle such as a truck or a semi-trailer vehicle normally comprises a large body structure which may shield radio transmission in some directions. Unless the antenna arrangement and its placement on the vehicle are both carefully designed, blockage can be experienced which is detrimental to communication system performance in one or more directions.

EP 0884796 A2 discloses an antenna device arranged to be integrated with the body of a vehicle.

WO 2021/019200 A1 discloses a vehicle antenna apparatus comprising directional antenna elements.

SE 2000168 A1 discloses an antenna arrangement for a vehicle.

US 2021/063557 A1 discloses a vehicle radar device.

US 2020/182963 A1 discloses a communication system for a vehicle.

There is a need for improved antenna arrangements for use with heavy-duty vehicles such as trucks and semi-trailers.

SUMMARY

It is an objective of the present disclosure to provide improved antenna arrangements for use in heavy-duty vehicles such as semi-trailer vehicles and trucks. The objective is obtained by a heavy-duty vehicle unit, such as a tractor or a trailer, comprising a body structure arranged to be supported on a horizontal ground surface by a plurality of wheels. The body structure comprises a front surface, a top surface, and left and right side surfaces. The front surface is arranged transversally to the ground surface and facing in a longitudinal direction of the vehicle unit, the left and right side surfaces are arranged transversally to the ground surface and facing in respective lateral directions of the vehicle unit, the top surface is arranged distally from the ground surface and transversal to the front surface and to the side surfaces. The heavy-duty vehicle unit comprises one or more horizontally polarized antenna elements arranged extending out from the left and/or right side surface of the body structure.

The placement of the antenna elements on the side surfaces of the body structure implies that the radio transmission will not be blocked when communicating, e.g., in the rearward direction, which is an advantage. Also, since the antennas are horizontally polarized, the radio signals will not be attenuated in the same way that a vertically polarized radio signal would have been due to the propagation along the side surface. Thus, an antenna arrangement particularly suitable for communication in a longitudinal direction of the vehicle is provided.

According to some aspects, at least one antenna element out of the one or more antenna elements is integrally formed with a side view mirror arranged extending out from the left and/or the right side surface. One or more antenna elements may also be integrally formed with wing-formed object arranged extending out from the left and/or the right side surface. These antenna mountings are un-obtrusive, aerodynamically efficient, and also aesthetically pleasing. One or more antenna elements can also be formed as a simple rod antenna arranged extending out from the left and/or from the right side surface, which is a design option that does not require much redesign of existing body structures.

According to some other aspects, the one or more horizontally polarized antenna elements form part of an antenna array also comprising one or more vertically polarized antenna elements arranged extending out from the top surface of the body structure. This antenna array then becomes dual polarized, which means that diversity combining techniques are enabled. The antenna array may for instance comprise a control unit and/or a radio transceiver arranged to select an antenna in the antenna array for communication with a remote radio transceiver. Alternatively or as a complement, the control unit and/or the radio transceiver can be arranged to combine a radio signal associated with the vertically polarized antenna elements with a radio signal associated with the horizontally polarized antenna elements, i.e., to implement some form of soft diversity combiner scheme.

There is also disclosed herein control units, radio transceivers, communication systems and vehicles, associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
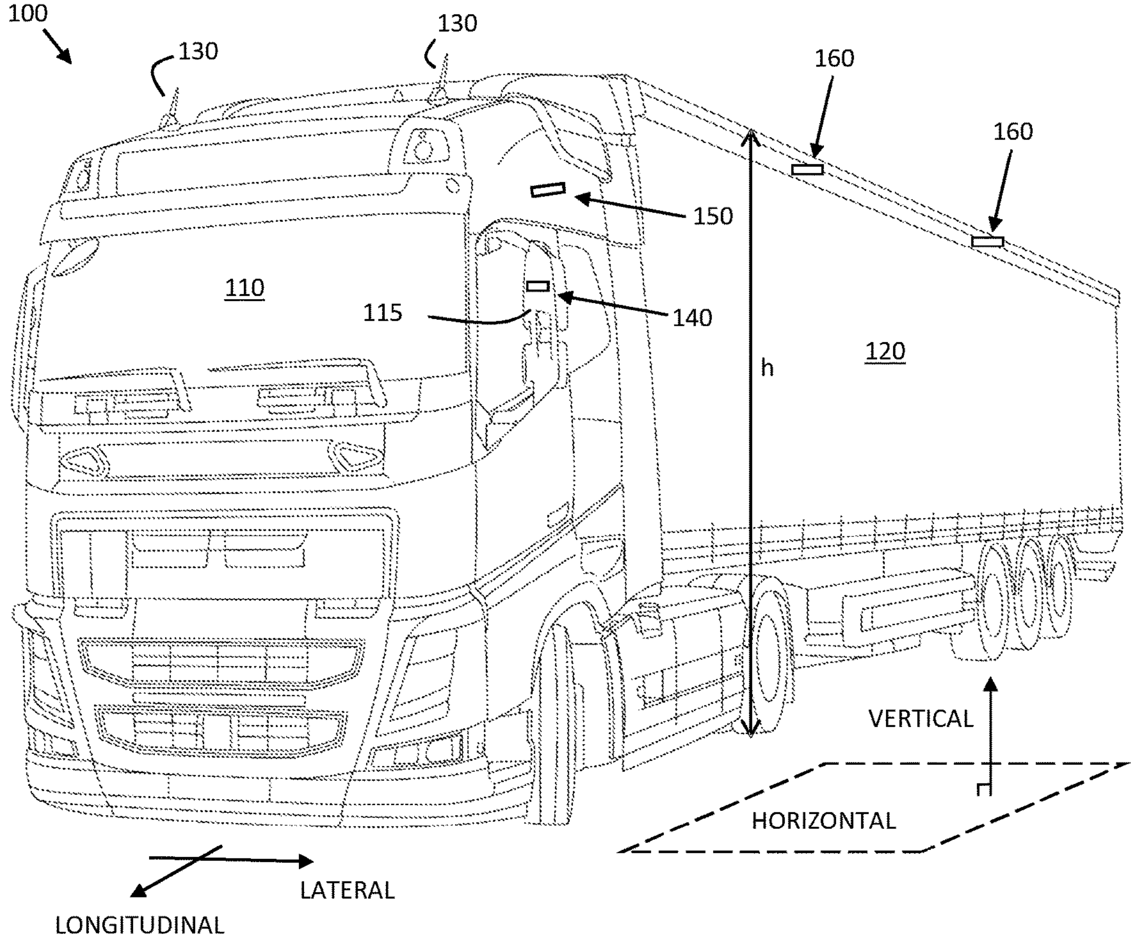
FIG. 1 illustrates an example heavy-duty vehicle.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

FIG. 1 illustrates an example heavy-duty vehicle 100, here in the form of a semi-trailer vehicle comprising a tractor 110 arranged to tow a trailer 120 via a fifth wheel connection in a known manner. The vehicle 100 is associated with a longitudinal direction extending along the elongation direction of the vehicle, and a lateral direction that extends orthogonally to the longitudinal direction, as illustrated in FIG. 1.

The vehicle 100 comprises an antenna arrangement with two antennas 130 arranged extending out from the cab roof of the tractor 110, i.e., the top surface of the foremost vehicle unit. These antennas can be used in V2X applications, for instance to communicate with other vehicles or with radio transceivers deployed throughout the traffic infrastructure. The antennas can also be used to receive satellite positioning system signals that enable geographical positioning of the vehicle 100.

A vehicle unit forms part of an articulated or rigid heavy-duty vehicle. Examples of vehicle units comprise the tractor 110 and the trailer 120. A rigid truck only comprises a single vehicle unit. A dolly vehicle for attaching one or more secondary trailer vehicle units (not shown in FIG. 1) is also considered a vehicle unit herein, and so are the one or more secondary trailers.

A vehicle unit comprises some form of chassis which supports a body structure on wheels. A body structure of a vehicle unit can for instance be the cab of a tractor, or the compartment of a trailer. The term body structure is to be interpreted broadly herein to comprise any form of physical structure arranged supported by the chassis of a vehicle unit.

However, because the trailer unit 120 normally has a height h which exceeds that of the top surface on the tractor 110, communication with radio transceivers located to the rear of the vehicle 100 via the antennas 130 can be blocked or at least significantly attenuated, which reduces the communication performance. A communication system using adaptive coding and modulation, such as the IEE 802.11p, would, if able to communicate at all, reduce its spectral efficiency to compensate for the loss in signal power due to the blockage, which means that the effective data rate of the communication is reduced.

ETSI EN 302 571 is a harmonized standard for radio communication in intelligent transport systems (ITS). The standard primarily covers radiocommunications equipment operating in the 5855 MHz to 5925 MHz frequency band. This standard, and many other similar approaches to V2X communications, does not stipulate any requirements when it comes to the polarization of the transmitted radio signals. In most if not all system studies involving V2X, vertical polarization is used. However, for many applications horizontal polarization would be an advantage.

Herein, when discussing polarization, it is understood that polarization is seldom exact in the sense that a vertical polarization of an antenna is exactly normal to a horizontal plane. Rather, polarization is to be construed broadly as encompassing polarization which has its strongest component in the given direction. Thus, to be of horizontal polarization means that the polarization is essentially normal to a vertical plane, but not necessarily exactly normal. Vertical polarization is also to be construed as being essentially normal to a horizontal plane. For instance, a deviation below some 30 degrees between the actual polarization direction of an antenna and the indicated polarization plane can be considered acceptable.

Propagation along a metal surface is attenuated for parallel polarization, but not for perpendicular polarization. For antennas on an essentially horizontal surface such as the roof top of a vehicle body structure, vertical polarization is preferred since it is perpendicular to the roof surface (assuming the roof top is essentially horizontally aligned). The cab is, as noted above, an example of a body structure and the roof top of the cab constitutes the top surface of the body structure. Putting V2X antennas on the roof top of the cab is not ideal because there is often a trailer or other form of vehicle unit body structure that is higher than the cab and which blocks out radiation in direction backwards from the vehicle. Heavy-duty vehicles normally comprise large body structures which are prone to blocking radio signals in one or more directions. The blockage can be caused by the body structure on the same vehicle unit where the antenna is mounted, and/or by a body structure on some other vehicle unit of the heavy-duty vehicle.

It has been realized that improved radio system performance can be obtained by placing the V2X antennas on the side surfaces of the body structure instead of on the roof, or at least in addition to placement on the roof. The antenna elements can be stand-alone antennas, such as rod antennas, or integrated in winglets, mirrors, or the like. For such antennas mounted on side surfaces of a vehicle unit, it is preferred to use horizontal polarization, at least for radiation backwards and forwards in the longitudinal direction of the vehicle, which are particularly important directions in future V2X systems. A dual polarized antenna array system with vertically polarized antennas arranged on the body structure top surface and horizontally polarized antennas arranged protruding out from the side surfaces of the body structure of course brings additional advantages. The vertically polarized antennas and the horizontally polarized antennas can then be used selectively where appropriate, or combined.

Figure 2:
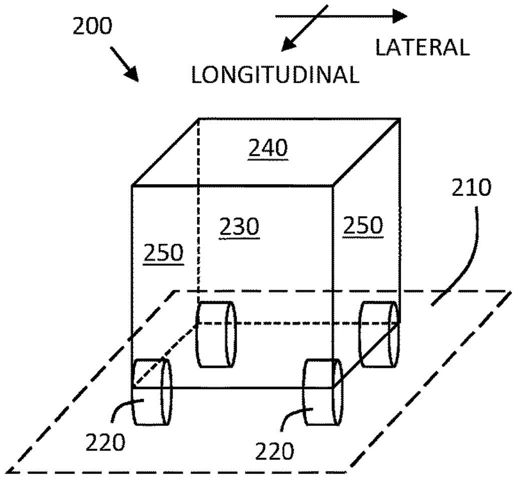
FIG. 2 schematically illustrates a vehicle body structure.

With reference also to FIG. 2, the vehicle 100 in FIG. 1 generally comprises two or more vehicle units 110, 120, each comprising a body structure 200 arranged to be supported on a horizontal ground surface 210 by a plurality of wheels 220. The body structure 200 has a front surface 230, a top surface 240 as well as left and right side surfaces 250.

These surfaces need not be flat nor parallel, rather, the concept of a body structure surface is to be broadly construed. The roof of a cab is, for instance, an example of a top surface, while the cab sides (comprising the doors) are examples of side surfaces. The front surface 230 is arranged transversally to the ground surface 210 and facing in a longitudinal direction of the vehicle unit 110, 120, the left and right side surfaces 250 are arranged transversally to the ground surface 210 and facing in respective lateral directions of the vehicle unit 110, 120, while the top surface 240 is arranged distally from the ground surface 210 and transversal to the front surface 230 and to the side surfaces 250.

Figure 3:
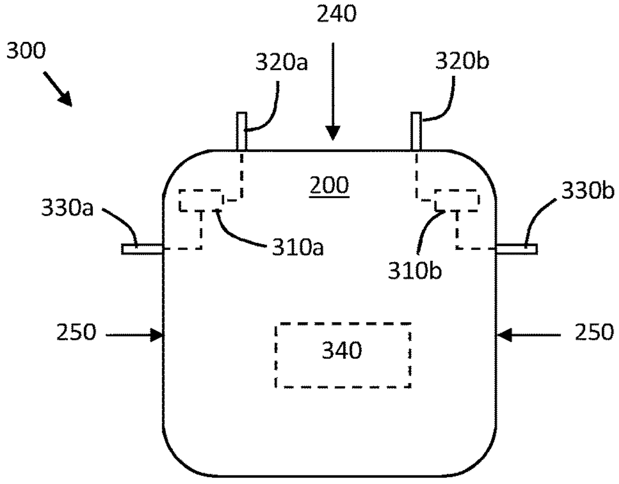
FIG. 3 schematically illustrates example antenna arrangements.

With reference primarily to FIG. 1 and to FIG. 3, the heavy-duty vehicle units discussed herein comprise one or more horizontally polarized antenna elements 140, 150, 160, 330*a*, 330*b* arranged extending out from the left and/or right side surface 250 of the body structure 200. These horizontally polarized antennas allow communication parallel to the side surfaces without aforementioned unwanted attenuation of the radio signals, since a horizontally polarized signal is less attenuated when propagating along a vertical surface compared to a vertically polarized radio signal. A further advantage of this type of antenna arrangement is that the radio signals can propagate more or less freely in the longitudinal direction of the vehicle 100, and particularly in the rearward direction.

An antenna element 140, 160 can, for instance, be integrally formed with a side view mirror 115 arranged extending out from the left and/or the right side surface 250, as illustrated in FIG. 1. Alternatively, or as a complement to the sideview mirror realization, an antenna element can be integrally formed with wing-formed object, sometimes referred to as a winglet, arranged extending out from the left and/or the right side surface 250. An antenna element formed as a protruding rod having the horizontal polarization has also been shown to yield good results, especially for communicating with vehicle to the rear of the vehicle 100, as would be the case in an emergency electronic brake light application of the herein disclosed antenna systems.

FIG. 3 illustrates a front view of an example vehicle unit body structure 200. In this case the one or more horizontally polarized antenna elements 330*a*, 330*b* form part of an antenna array which also comprises one or more vertically polarized antenna elements 320*a*, 320*b* arranged extending out from the top surface 240 of the body structure 200. This array antenna is a dual-polarized antenna array capable of emitting radio signals in both horizontal and/or vertical polarization. The vertical component of such signals is emitted or received along the more or less horizontal top surface 240 of the vehicle unit, while the horizontal signal component is emitted or received along the more or less vertical side surface of the vehicle unit. Neither signal experiences the unwanted attenuation from propagating along a plane.

A control unit 310*a*, 310*b* can be arranged in connection to the antenna elements, for instance in-between a radio transceiver 340 and the antenna elements. This control unit 310*a*, 310*b* can advantageously be arranged to select an antenna in the antenna array for communication with a remote radio transceiver, or to weight radio signals of the two polarizations together during transmission and/or during reception in order to optimize communication via the antenna array.

The control unit 310*a*, 310*b*, or the radio transceiver 340 optionally implements a soft diversity combining signaling scheme where the radio signals received via the horizontal and vertical polarization receivers is combined in order to improve some performance criterion, such as received signal strength (RSS), signal-to-noise-ratio (SNR), or some other suitable performance criterion. For instance, maximum-ratio combining (MRC) can be used, or some variant thereof. MRC is a method of diversity combining in which the signals from each polarization channel are added together, the gain of each channel is made proportional to the root-mean-squared signal level and inversely proportional to the mean square noise level in that channel. Diversity transmission can also be employed using similar principles. In this case a radio signal can be transmitted using both polarizations at the same time, which allows a receiver of the transmitted radio signals to optimize reception conditions, at least if the receiver comprises a dual polarized antenna system of some sort.

The control unit 310*a*, 310*b*, or the radio transceiver 340, may also implement a hard switching type of diversity, where the most appropriate antenna out of the horizontally and vertically polarized antennas is selected for a given radio reception operation or radio transmission operation. The criteria for selection can be, for instance, SNR or RSS, or some other performance metric such as bit-error-rate (BER). The system then receives respective radio signal components via the two polarizations, and then selects the one which is deemed most promising for error-free data detection.

Figure 4:
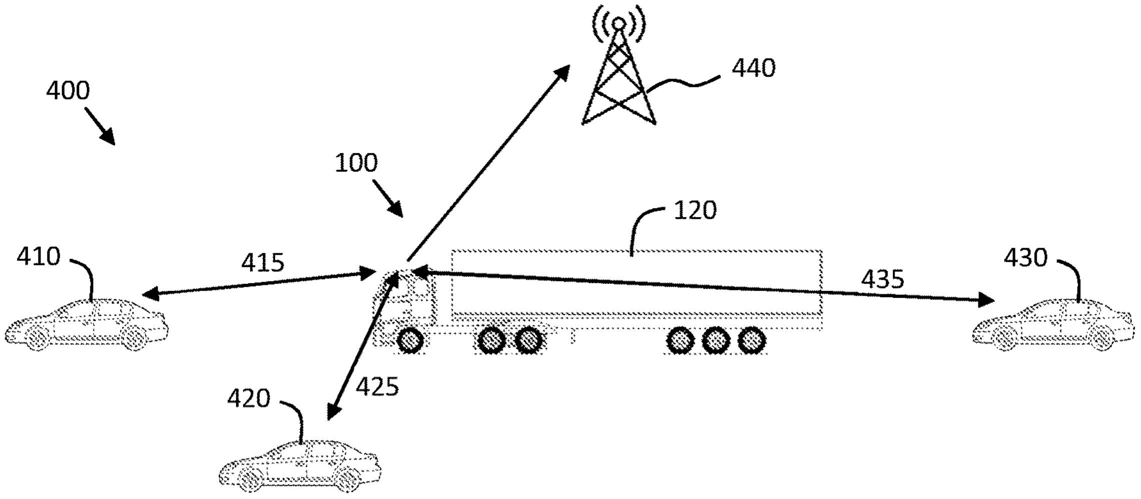
FIG. 4 illustrates radio communication involving a heavy-duty vehicle.

FIG. 4 illustrates an example V2X communication scenario 400 where a heavy-duty vehicle 100 communicates with a number of other vehicles 410, 420, 430 and also with fixed infrastructure 440. The directions of communication differ, where some directions of communication 435 are blocked by the body structure of the trailer vehicle unit 120, while other directions of communication 415, 425 are clear line-of-sight (LOS).

A communication system comprising the antenna array discussed above, which has vertically polarized antenna elements mounted on a top surface of the vehicle and horizontally polarized antenna elements mounted on one or more side surfaces of the vehicle 100 can implement a diversity scheme of communication where either a suitable antenna polarization is selected for each communication direction 415, 425, 435, or where both polarizations are combined in, e.g., an MRC diversity combiner. The control unit 310*a*, 310*b* or the radio transceiver 340 may obtain performance metrics such as RSS or SNR, and perform signal combining or signal switching based on the obtained metric.

Figure 5A:
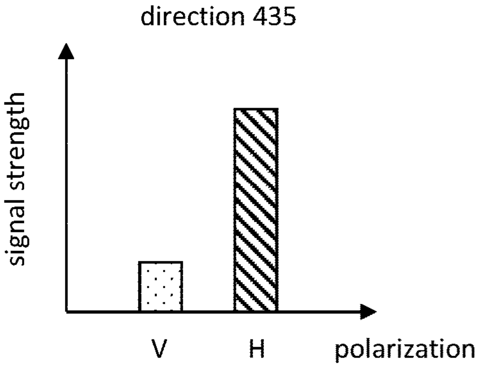
FIGS. 5A-B show example signal strength vs antenna polarization.
Figure 5B:
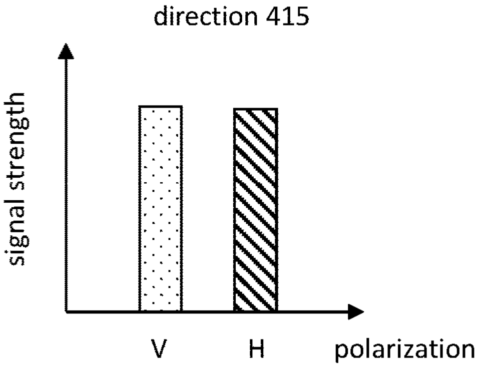

FIGS. 5A and 5B illustrate a simplified example. In FIG. 5A the situation for communicating from the vehicle 100 in FIG. 4 to the car 430 behind the vehicle is exemplified. In this case the body structure of the trailer vehicle unit 120 is blocking the signal path from the top surface of the tractor 110, which means that the received signal strength on the vertical polarization (V) is reduced compared to the signal strength of the horizontal polarization (H). Thus, the control unit 310*a*, 310*b*, and/or the radio transceiver 340, implementing diversity combining will favor the horizontal polarization for communication with the car 430, e.g., during application of emergency electronic brake lights. In FIG. 5B, the direction of communication is instead clear LOS, and the polarizations are more or less equal in terms of signal strength. In this case the control unit 310*a*, 310*b* and/or the radio transceiver 340 can use both polarizations in a diversity combining scheme, or just select one of them.

Further advantages can be obtained if the polarization used for communication at the vehicle 100 is matched to a polarization of the remote radio transceiver, i.e., the radio transceiver at one of the other vehicle 410, 420, 430 or the infrastructure transceiver 440. The control unit 310*a*, 310*b*, however, does not need to be aware of the actual antenna design at the remote end since the diversity performance metric will also reflect the antenna polarization at the remote transceiver.

Figure 6:
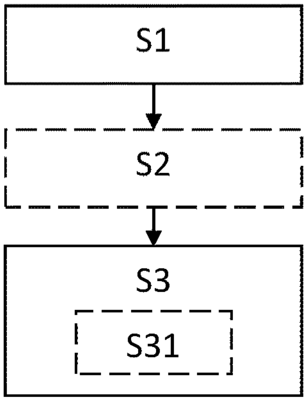
FIG. 6 is a flow chart illustrating example methods.

FIG. 6 is a flow chart which illustrates a method that summarizes some of the above discussions. There is illustrated a method for radio communication involving a heavy-duty vehicle unit 110, 120 comprising a body structure 200 arranged to be supported on a horizontal ground surface 210 by a plurality of wheels 220. The body structure 200 comprises a front surface 230, a top surface 240 and left and right side surfaces 250, where the front surface 230 is arranged transversally to the ground surface 210 and facing in a longitudinal direction of the vehicle unit 110, 120, where the left and right side surfaces 250 are arranged transversally to the ground surface 210 and facing in respective lateral directions of the vehicle unit 110, 120, and where the top surface 240 is arranged distally from the ground surface 210 and transversal to the front surface 230 and to the side surfaces 250. The method comprises arranging S1 one or more horizontally polarized antenna elements 140, 150, 160, 330*a*, 330*b* extending out from the left and/or right side surface 250 of the body structure 200, and communicating S3 a radio signal via the one or more horizontally polarized antenna elements 140, 150, 160, 330*a*, 330*b*.

According to some aspects, the method further comprises arranging S2 one or more vertically polarized antenna elements 130 extending out from the top surface 240 of the body structure 200, and performing S31 a radio signal diversity combining operation based on the one or more horizontally polarized antenna elements 140, 150, 160, 330*a*, 330*b* and the one or more vertically polarized antenna elements 130. The radio signal diversity combining operation may, for instance, comprise a maximum ratio combining operation or a hard switching operation.

Figure 7:
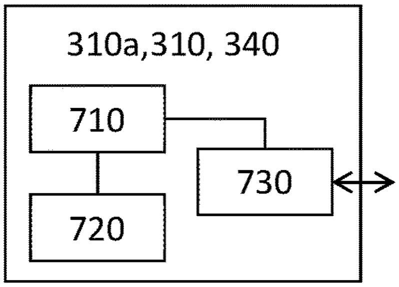
FIG. 7 illustrates a control unit and/or a radio transceiver.

FIG. 7 schematically illustrates, in terms of a number of functional units, the components of a control unit such as the control units 310*a*, 310*b*, and the radio transceiver 340 according to embodiments of the discussions herein. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit or the radio transceiver to perform a set of operations, or steps, such as the methods discussed in connection to FIG. 6. For example, the storage medium 730 may store the set of operations, and the processing circuitry 710 may be configured to retrieve the set of operations from the storage medium 730 to cause the control unit to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The control unit 310*a*, 310*b*, 340 may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the control unit, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

Figure 8:
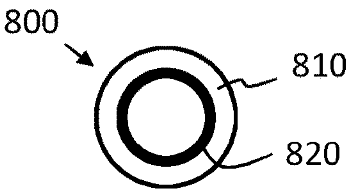
FIG. 8 shows an example computer program product.

FIG. 8 illustrates a computer readable medium 810 carrying a computer program comprising program code means 820 for performing the methods illustrated in FIG. 6, when said program product is run on a computer. The computer readable medium and the code means may together form a computer program product 800.

The invention claimed is:

1. A heavy-duty vehicle unit comprising a body structure arranged to be supported on a horizontal ground surface by a plurality of wheels, the body structure comprising a front surface, a top surface and left and right side surfaces, where the front surface is arranged transversally to the ground surface and facing in a longitudinal direction of the vehicle unit, where the left and right side surfaces are arranged transversally to the ground surface and facing in respective lateral directions of the vehicle unit, where the top surface is arranged distally from the ground surface and transversal to the front surface and to the side surfaces, wherein the heavy-duty vehicle unit comprises one or more horizontally polarized antenna elements, each antenna element arranged extending out from the left or right side surface of the body structure, wherein the one or more antenna elements are configured for transmission and/or reception of radio signals in the longitudinal direction of the vehicle unit.

2. The heavy-duty vehicle unit according to claim 1, wherein at least one antenna element out of the one or more antenna elements is integrally formed with a side view mirror arranged extending out from the left or the right side surface.

3. The heavy-duty vehicle unit according to claim 1, wherein an antenna element out of the one or more antenna elements is integrally formed with wing-formed object arranged extending out from the left or the right side surface.

4. The heavy-duty vehicle unit according to claim 1, wherein an antenna element is formed as a rod antenna arranged extending out from the left or from the right side surface.

5. The heavy-duty vehicle unit according to claim 1, where the one or more horizontally polarized antenna elements form part of an antenna array also comprising one or more vertically polarized antenna elements arranged extending out from the top surface of the body structure.

6. The heavy-duty vehicle unit according to claim 5, where the antenna array comprises a control unit and/or a radio transceiver arranged to select an antenna in the antenna array for communication with a remote radio transceiver.

7. The heavy-duty vehicle unit according to claim 5, where the control unit and/or the radio transceiver is arranged to combine a radio signal associated with the vertically polarized antenna elements with a radio signal associated with the horizontally polarized antenna elements.

8. The heavy-duty vehicle unit according to claim 1, where the body structure forms part of a tractor of an articulated heavy-duty vehicle.

9. The heavy-duty vehicle unit according to claim 1, where the body structure forms part of a trailer of an articulated heavy-duty vehicle.

10. A heavy-duty vehicle comprising a heavy-duty vehicle unit according to claim 1.

11. A method for radio communication involving a heavy-duty vehicle unit comprising a body structure arranged to be supported on a horizontal ground surface by a plurality of wheels, the body structure comprising a front surface, a top surface and left and right side surfaces, where the front surface is arranged transversally to the ground surface and facing in a longitudinal direction of the vehicle unit, where the left and right side surfaces are arranged transversally to the ground surface and facing in respective lateral directions of the vehicle unit, where the top surface is arranged distally from the ground surface and transversal to the front surface and to the side surfaces, the method comprising arranging one or more horizontally polarized antenna elements, each antenna element extending out from the left or right side surface of the body structure, configuring the one or more horizontally polarized antenna elements for transmission and/or reception of radio signals in the longitudinal direction of the vehicle unit, and communicating a radio signal via the one or more horizontally polarized antenna elements.

12. The method according to claim 11, further comprising arranging one or more vertically polarized antenna elements extending out from the top surface of the body structure, and performing a radio signal diversity combining operation based on the one or more horizontally polarized antenna elements and the one or more vertically polarized antenna elements.

13. The method according to claim 11, where the radio signal diversity combining operation comprises a maximum ratio combining operation or a hard switching operation.

14. A non-transitory computer readable medium storing a computer program comprising program code for performing the steps of claim 11 when said program code is run on a computer or on processing circuitry of a control unit.

* * * * *